Jan. 17, 1950
L. COLE
2,495,052
ROOT CUTTER
Filed Feb. 27, 1947
2 Sheets-Sheet 1
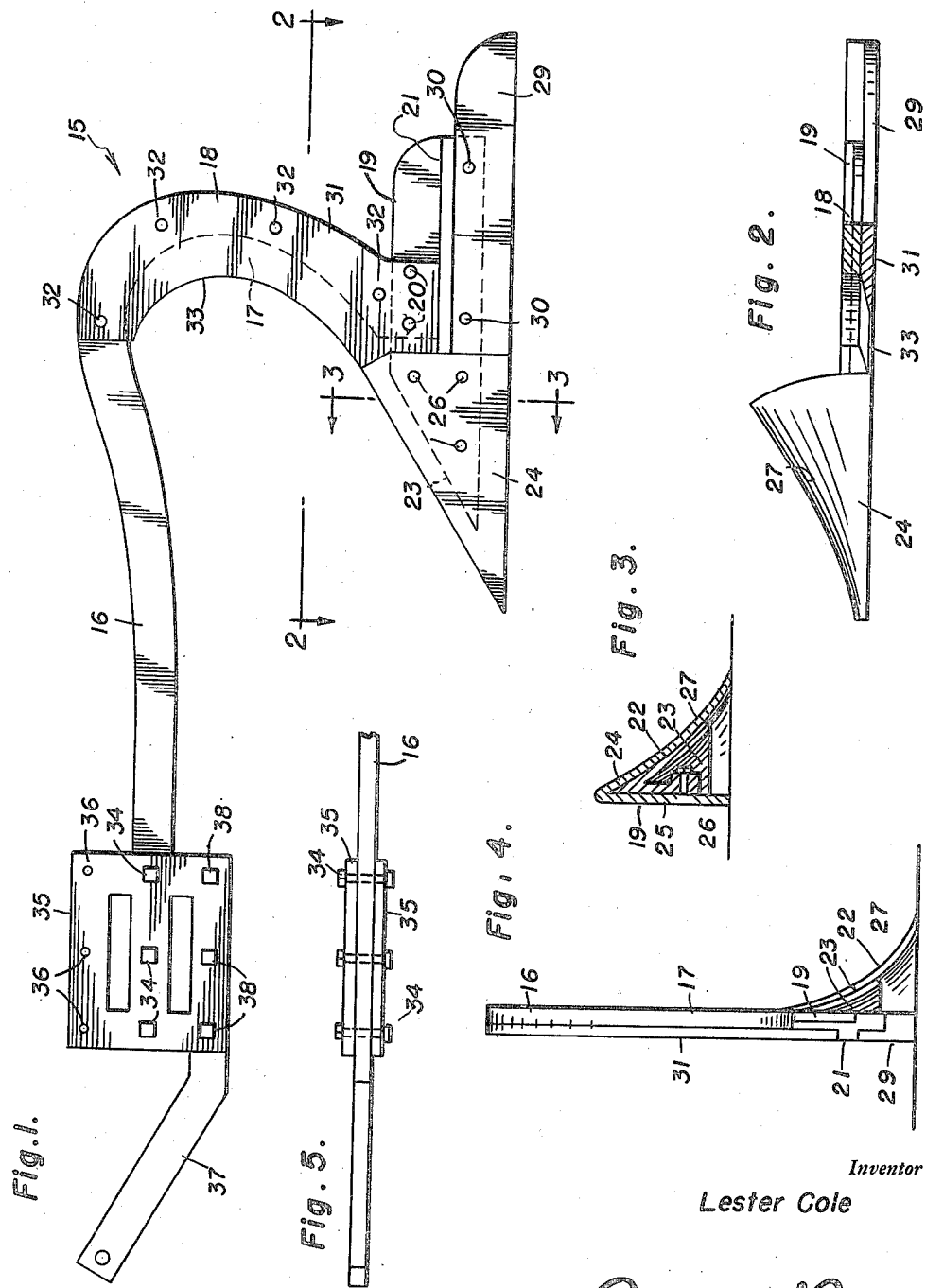
Inventor
Lester Cole

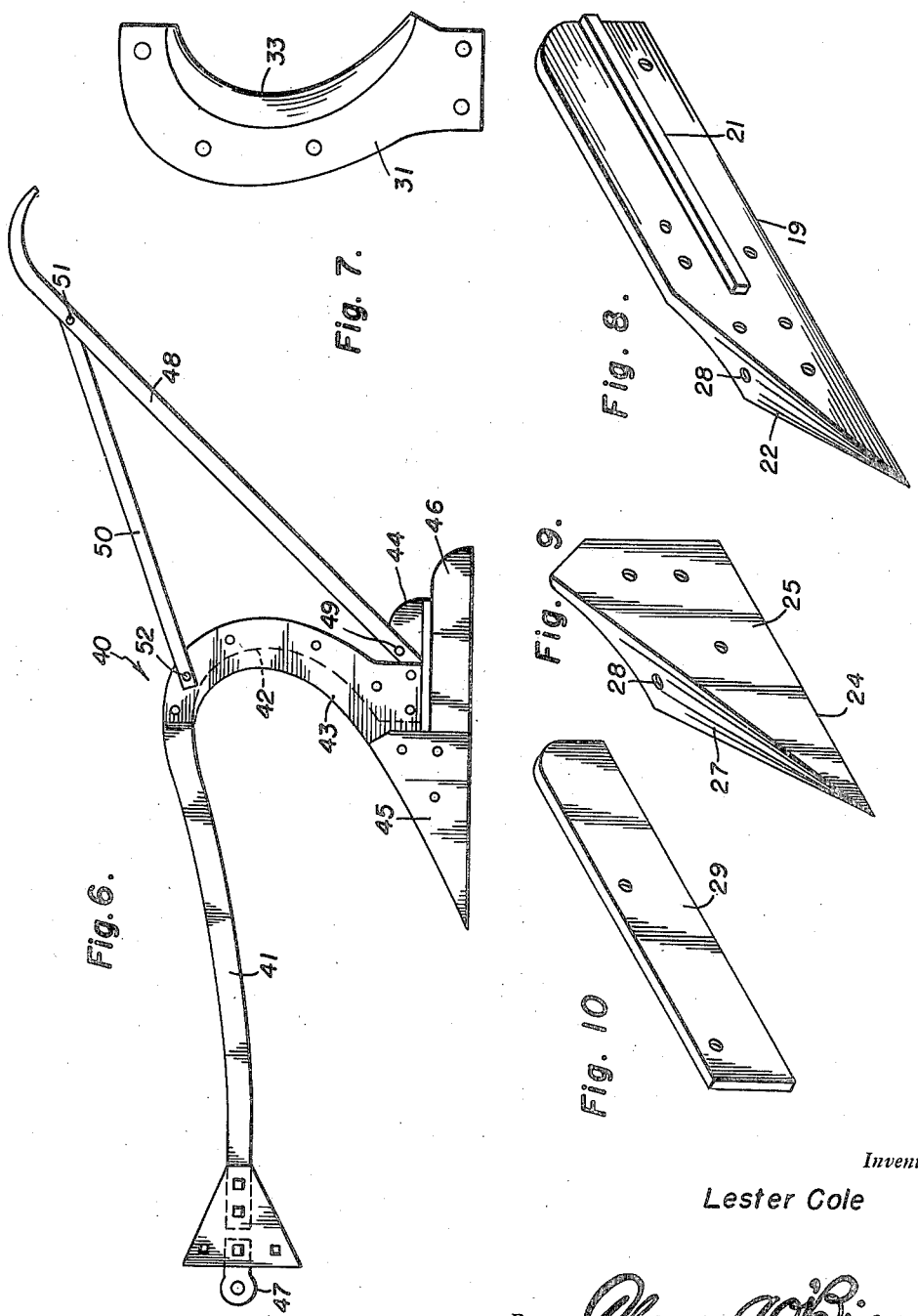

Patented Jan. 17, 1950

2,495,052

UNITED STATES PATENT OFFICE 2,495,052

ROOT CUTTER

Lester Cole, Nicholls, Ga.

Application February 27, 1947, Serial No. 731,373

1 Claim. (Cl. 97—226.1)

This invention relates to new and useful improvements and structural refinements in root cutters, and the principal object of the invention is to provide a device of the character herein described, which may be conveniently and effectively employed for severing subterranean roots, so as to increase the fertility of the land by the preservation of moisture and plant nourishment which the roots would otherwise consume.

A further object of the invention is to provide a root cutter which is of a simple, discerptible nature and which may be readily adjusted for the severing of roots disposed at various levels under the ground surface.

Another object of the invention is to provide a root cutter which may be conveniently drawn by a tractor, as well as by a horse or horses.

An additional object of the invention is to provide a root cutter which will not easily become damaged and which will readily lend itself to economical manufacture.

With the above more important objects in view and such other objects as may become apparent as this specification proceeds, the invention consists essentially of the construction and arrangement of parts as shown in the accompanying drawings in which:

Figure 1 is a side elevation of the invention;

Figure 2 is a cross sectional view, taken substantially in the plane of the line 2—2 in Figure 3;

Figure 3 is a cross sectional view, taken substantially in the plane of the line 3—3 in Figure 1;

Figure 4 is a rear end view of the subject shown in Figure 1;

Figure 5 is a fragmentary plan view of the front end portion of the draw beam shown in Figure 1;

Figure 6 is a side elevation showing a modified embodiment of the invention;

Figure 7 is an elevational view of a cutter blade used in the invention;

Figure 8 is a perspective view of a carrier plate;

Figure 9 is a perspective view of a cutter point, and

Figure 10 is a perspective view of a foot which, together with the parts shown in Figures 8 and 9, is also used in the invention.

Like characters of reference are used to designate like parts in the specification and throughout the several views.

Referring now to the accompanying drawings in detail, the invention consists of a root cutter designated generally by the reference character 15, the same embodying in its construction a draw beam 16 provided with a downwardly arcuated rear end portion which forms what may be referred to as a support 17.

A carrier plate 19, configurated substantially as shown in Figure 8, is secured to the lower end portion of the support 18 by means of a pair of screws or rivets 20. The plate 19 is formed with a longitudinally extending rib 21 and the forward end portion of the plate is provided with a laterally flared side wall 22, as will be clearly apparent.

It will be noted that the side wall 22 co-acts with the upright body portion of the plate to provide a nose piece 23 which, in turn, is receivable in a cutter point 24. The latter includes an upright wall 25 secured to the plate 19 by means of the bolts 26 and a laterally flared wall 27 secured to the wall 22 of the plate 19 by further bolts (not shown) receivable in the apertures 28.

A foot 29, illustrated in the accompanying Figure 10, is secured to the plate 19 by means of the bolts 30 and the upper edge of the foot is in contact with the lower edge of the rib 21, as is best shown in Figures 1 and 4.

The cutter blade 31 is best illustrated in the accompanying Figure 7 and is configurated more or less in conformity with the aforementioned support 18 to which it is secured by suitable bolts or rivets 32. The arcuate forward edge of the blade is tapered and constitutes a cutting edge 33, as will be clearly apparent.

The forward end portion of the draw beam 16 is adjustably connected by means of suitable bolts 34 to a pair of spaced connecting plates 35. These plates are disposed at the sides of the beam and are provided with vertically spaced rows of apertures 36 to receive the bolts. A draw bar 37 is also secured to the plates 35 by means of further bolts 38, and it will be noted that by simply changing the relative positions of the draw bar and of the draw beam with respect to the plates 35, the operating depth of the cutter may be easily and conveniently adjusted.

This embodiment of the invention is particularly adapted to be drawn by a tractor, or the like, which, of course, is connected to the draw bar 37, as will be clearly understood.

Referring now to the modified embodiment of the invention illustrated in the accompanying Figure 6, the root cutter shown herein is designated by the general reference character 40. The structure thereof is substantially the same as that of the cutter 15, comprising a draw beam 41, a support 42, a cutter blade 43, a carrier plate 44, a point 45, and finally, a foot 46.

However, this embodiment of the invention is equipped with a suitable draft gear 47, so that the cutter may be drawn by a horse or horses. In this instance, the cutter is also provided with a pair of upwardly and rearwardly extending handles 48, the lower ends of which are secured as at 49 to the carrier plate 44. The handles 48 are reinforced by means of suitable tie bars 50 which are secured at one end thereof to the handles as at 51, while the remaining ends of the tie bars are connected to the blade and support structure, as at 52.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

In a root cutting blade assembly, the combination of a vertically disposed supporting plate having a concave forward edge, a horizontally elongated carrier plate secured to the lower end of said support plate and extending forwardly and rearwardly therefrom, the forward end portion of said carrier plate being equipped with a laterally and downwardly extending side wall and constituting a pointed nose-piece, the intermediate and rear end portions of said carrier plate being provided with a longitudinal rib spaced above the lower edge of the carrier plate, a hollow cutter point positioned on and enclosing said nose-piece, a flat foot secured to said carrier plate, said foot having an upper edge in abutment with said rib and a forward edge in abutment with a rear edge of said cutter point, and a cutter blade secured to said supporting plate and having a flanged, arcuate cutting edge superimposed on the concave forward edge of said supporting plate.

LESTER COLE.

REFERENCES CITED

The following references are of record in the file of this patent:

UNITED STATES PATENTS

| Number  | Name        | Date          |
|---------|-------------|---------------|
| 941,224 | Bethune     | Nov. 23, 1909 |
| 943,584 | Whittington | Dec. 14, 1909 |